ved bar 1 passes, said bar being formed in its upper edge with a
UNITED STATES PATENT OFFICE.

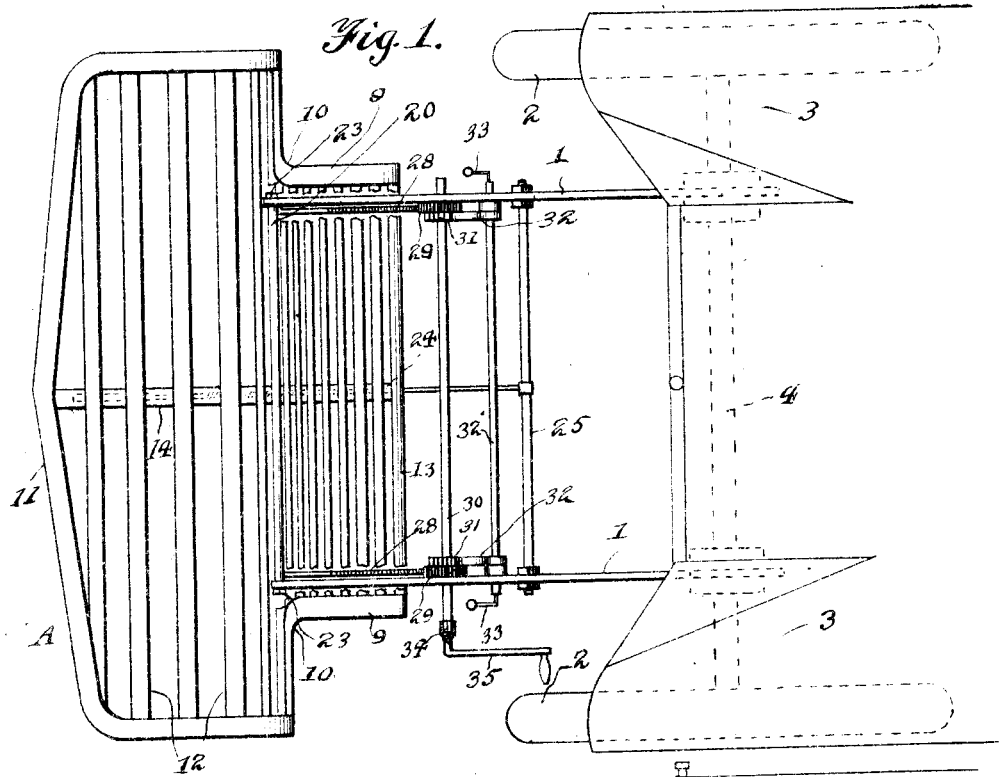
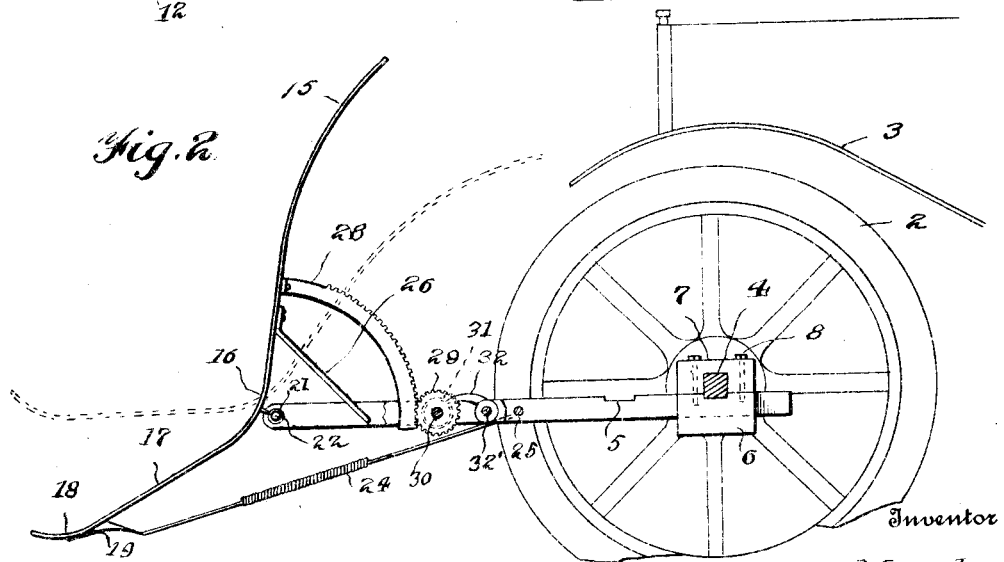

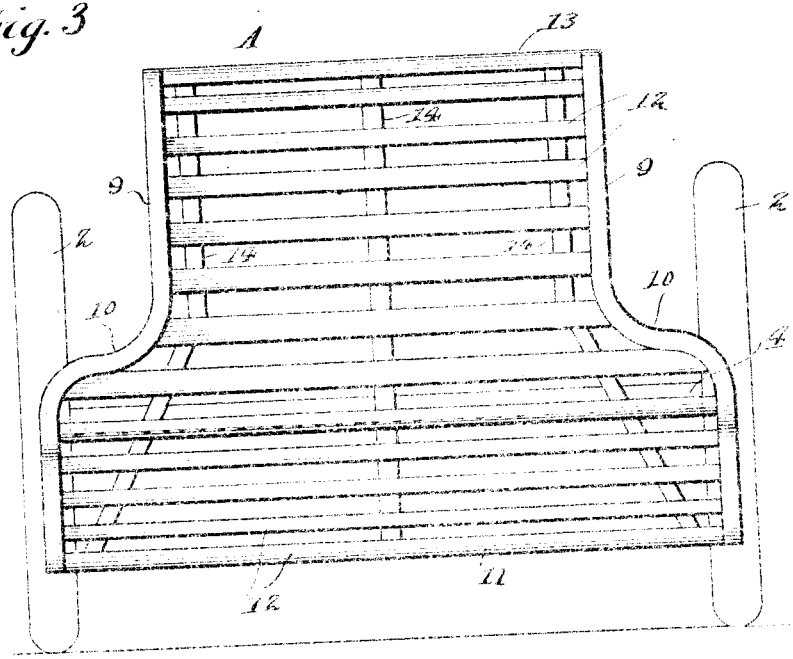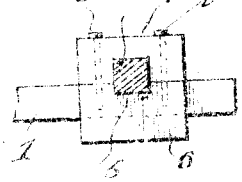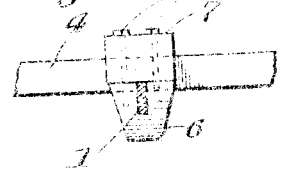

ALFRED MURCH, OF WEST FITCHBURG, MASSACHUSETTS.

AUTOMOBILE-FENDER.

1,171,744. Specification of Letters Patent. Patented Feb. 15, 1916.

Application filed August 21, 1915. Serial No. 46,668.

*To all whom it may concern:*

Be it known that I, ALFRED MURCH, a citizen of the United States, residing at West Fitchburg, in the county of Worcester and State of Massachusetts, have invented new and useful Improvements in Automobile-Fenders, of which the following is a specification.

This invention relates to fenders especially adapted for use on automobiles, the object in view being to produce an effective, resilient and shock absorbing fender which will not injure a person struck thereby, the fender being so mounted and arranged that it will tilt rearwardly under an impact with a person or object and be locked in such rearward position, the lower portion of the fender being at the same time elevated so as to form a sort of cradle or basket to prevent the person picked up thereby from being thrown to the ground and subsequently injured by contact with the wheels or chassis and other parts of the machine.

A further object of the invention is to provide a resistance spring which will act to cushion the tilting movement of the fender when subjected to impact or contact with a person or object.

With the above and other objects in view, the invention consists in the novel construction, combination and arrangement of parts, as herein described, illustrated and claimed.

In the accompanying drawings:—Figure 1 is a plan view of the forward portion of an automobile showing the fender in its applied relation thereto. Fig. 2 is a view partly in side elevation and partly in section of the same. Fig. 3 is a plan view thereof. Fig. 4 is a detail perspective view of one of the limiting guides and braces. Fig. 5 is a cross section through the front axle of an automobile showing the means for fastening the fender supporting bars thereto. Fig. 6 is a view taken at right angles to Fig. 5.

The main supporting bars of the fender are shown at 1, the same being arranged at a suitable distance apart governed by the wheels 2 and fenders 3 of the machine in connection with which the fender is used. The means for attaching each of the fender supporting bars to the front axle is illustrated in Figs. 5 and 6 in which 4 designates the front axle of the automobile beneath which the adjacent bar 1 passes, said bar being formed in its upper edge with a notch 5 to partially receive the axle 4 as clearly indicated in Fig. 5. Several notches 5 may be provided to enable the fender supporting bars to be adjusted in a fore and aft direction.

The parts 1 and 4 are firmly and fixedly connected together by means of a two-part split block comprising a lower member 6 and an upper member 7, said members 6 and 7 being formed in their meeting faces with notches to receive the axle 4 and being firmly fastened together in clamped relation to the bar 1 by means of screws or bolts 8. The supporting bars 1 extend considerably in advance of the front wheels 2 of the machine and upon the forward extremities thereof is pivotally mounted the frame of the fender or scoop which is designated generally at A, the body of the fender being shown as comprising the oppositely arranged side bars 9 which are offset as shown at 10 to enable the forward portion of the fender to extend in front of the wheels 2 and form the guards therefor. The bars 9 are connected at their forward extremities by the front impact bar 11 and are connected in rear of said bar 11 by any desired number of slats 12. Extending from the front bar 12 to the rear bar 13 of the fender frame are stringers 14 to which the slats 12 are fastened in any suitable way, the forward portions of the outside stringers 14 being deflected outwardly so as to diverge from each other as shown in Fig. 3 in order to more effectively brace the body of the fender or scoop.

As shown in Fig. 2, the body of the fender is formed with a rearwardly curving upper portion 15, an approximately central concaved portion 16, and a forwardly inclining and sloping lower portion 17 terminating in an upturned forward extremity or edge 18 beneath which is arranged a central shoe 19. Just in rear of the concaved portion 16 of the fender or scoop there is a spacing tube 20 of sufficient length to fit between the supporting bars 1. This tube 20 is rigidly fastened at intervals to the stringers 14 and thus bears a rigid relation to the body of the fender. A fulcrum bolt 21 is inserted through holes 22 in the forward extremities of the supporting bars 1 and also through the tube 20 and the ends thereof are secured by means of nuts 23.

A cushioning spring 24 is connected at its forward extremity to the shoe 19 and at its rear extremity to a bolt 25 connecting the supporting bars 1 as shown in Fig. 1. The spring 24 not only serves to hold the fender body A in its working or receiving position but it also acts to resist the rearward movement of the upper portion 15 of the fender upon striking a person or object thereby cushioning the blow or impact. Guides 26 are fastened to the fender body as shown in Fig. 2 and are formed with longitudinal slots 27 by which they are adapted to embrace the supporting bars 1, the said guides acting as stops to limit the rearward movement of the upper portion of the fender and also serving as lateral braces for the fender body in relation to the supporting bars 1.

In order to lock the fender in its final or holding position as indicated by dotted lines in Fig. 2, the upper portion of the fender body has rigidly secured thereto a pair of curved rack bars 28 the teeth of which engage pinions 29 fast on a shaft 30 which is journaled in the supporting bars 1. Fast on the same shaft 30 and adjacent to each of the pinions 29 is a ratchet wheel 31 which is engaged by one of a pair of detents or dogs 32 fastened to a rock shaft 32' also journaled in the supporting bars 1. At one end the shaft 32' is shown as provided with a weighted crank arm or handle 33 by means of which the detent 32 may be thrown out of engagement with the ratchet wheel 31 to enable the fender to be returned to its receiving position by means of the spring 24.

In order to release the detent 32, the end of the shaft 30 is preferably squared as shown at 34 to receive a detachable crank 35 by the movement of which the shaft 30 may be turned sufficiently to relieve the engagement between it and the detent 32. The shaft 32' is then turned to a position where the detents 32 will be maintained out of engagement with the ratchet wheels 31 until the spring 24 has returned the fender or scoop A to its normal position.

Having thus described my invention, I claim:—

1. In an automobile fender, the combination with the front axle thereof, of forwardly extending fender supporting bars secured in fixed relation to the axle and arranged substantially parallel to each other, a fender body, a spacing tube secured in fixed relation to said fender body at the rear thereof and bridging the space between said supporting bars, a bolt extending through said supporting bars and tube, resilient means for yieldingly resisting the rearward movement of the upper portion of the fender body, and means for locking said fender body at any point in the rearward movement.

2. In an automobile fender, the combination with the front axle thereof, of forwardly extending fender supporting bars secured in fixed relation to the axle and arranged substantially parallel to each other, a fender body, a spacing tube secured in fixed relation to said fender body at the rear thereof and bridging the space between said supporting bars, a bolt extending through said supporting bars and tube, resilient means for yieldingly resisting the rearward movement of the upper portion of the fender body, means for locking said fender body at any point in the rearward movement, said means comprising a curved rack bar bearing a fixed relation to the fender body, a pinion on one of the fender supporting bars driven by said curved rack bar, and pawl and ratchet means for locking said pinion.

3. In an automobile fender, the combination with the front axle thereof, of forwardly extending fender supporting bars secured in fixed relation to the axle and arranged substantially parallel to each other, a fender body, a spacing tube secured in fixed relation to said fender body at the rear thereof and bridging the space between said supporting bars, a bolt extending through said supporting bars and tube, resilient means for yieldingly resisting the rearward movement of the upper portion of the fender body, means for locking said fender body at any point in the rearward movement, and combined stops, guides and braces secured to the fender body and slotted to straddle the fender supporting bars.

In testimony whereof I affix my signature in presence of two witnesses.

ALFRED MURCH.

Witnesses:
 WILLIAM NEWCOMB,
 GEORGE NEWCOMB.